UNITED STATES PATENT OFFICE.

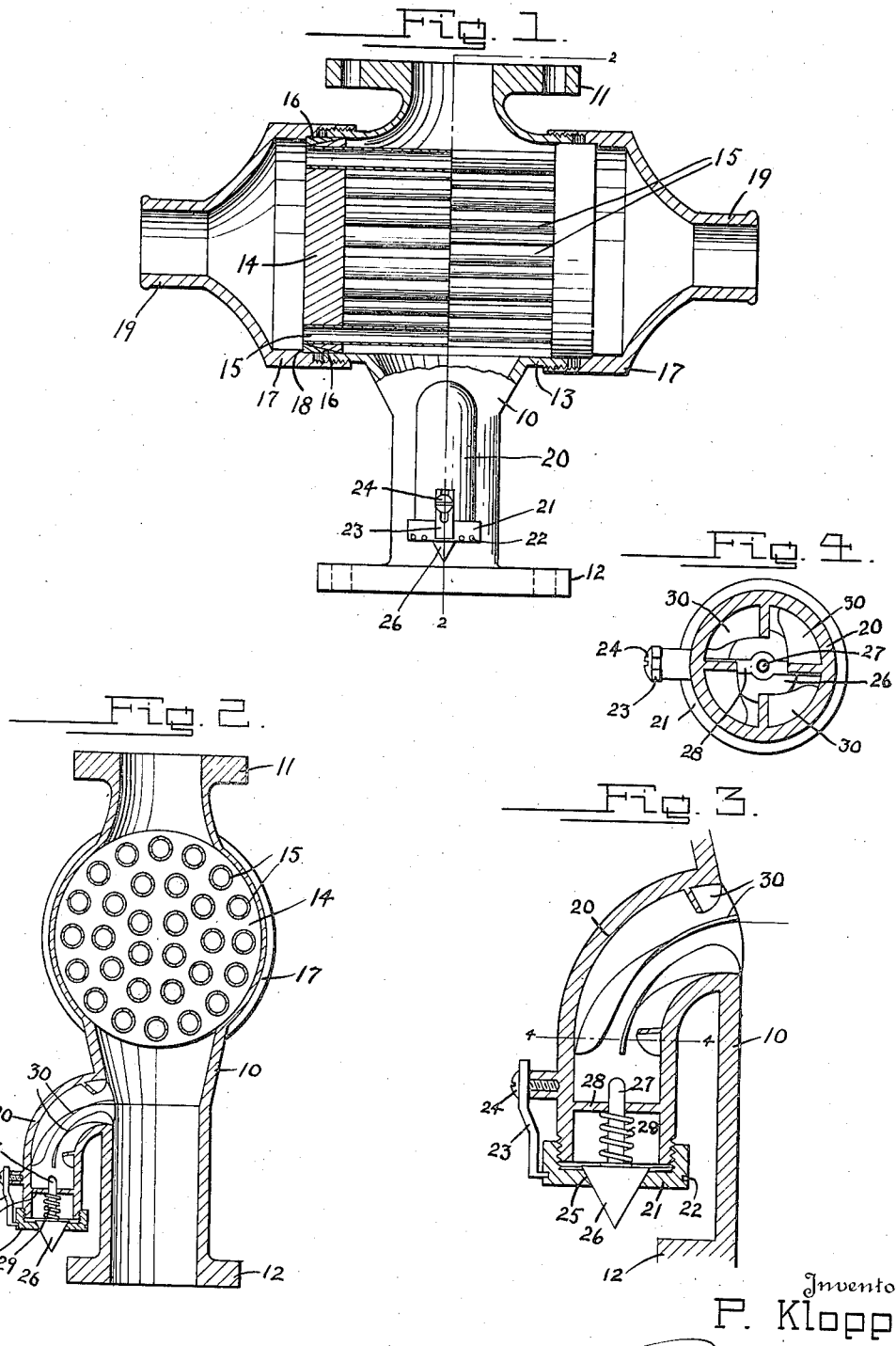

PETER KLOPP, OF DETROIT, MICHIGAN.

FUEL-VAPORIZER.

1,249,119.  Specification of Letters Patent.  Patented Dec. 4, 1917.

Application filed January 22, 1917. Serial No. 143,768.

*To all whom it may concern:*

Be it known that I, PETER KLOPP, a subject of the Queen of Holland, and a resident of Detroit, in the county of Wayne and State of Michigan, have invented a certain new and useful Improvement in Fuel-Vaporizers, of which the following is a specification.

The present invention relates generally to internal combustion engines, and the like wherein a charge of fuel is taken into the cylinders of the engine, and refers more particularly to an improved device for thoroughly vaporizing fuel prior to its entrance into the cylinders of the engine.

An object of the present invention is to provide a vaporizer of this character which utilizes the exhaust gases from the engine for heating the fuel; which provides for an intimate relation of the hot gases and the charge to thoroughly heat the latter; and which provides a relatively large heating surface for contact with the charge as the latter is drawn into the engine.

It is the further aim of the present invention to provide a device of this character which may be easily and quickly interposed between the carbureter and the intake manifold of an internal combustion engine, and a device which may be quickly and easily applied to the exhaust manifold to utilize the heated products of combustion passing therethrough.

A still further aim of the present invention is to provide the vaporizer with an improved air-supplying means for delivering air to the charge in a whirling condition so as to intimately mix with the charge and cause the latter to be fed throughout the vaporizing casing, for thoroughly heating the combined air and the charge.

Various other objects and advantages of this invention, as well as the above, will be more specifically brought out in the following detailed description of the present preferred embodiment, the same being illustrated in the accompanying drawing wherein:

Figure 1 is a vertical sectional view taken through a vaporizer constructed according to the present invention, parts of the same being shown in elevation.

Fig. 2 is a transverse section taken through the vaporizer on the line 2—2 of Fig. 1, disclosing the auxiliary air intake.

Fig. 3 is a detail enlarged fragmentary view of the air intake in section.

Fig. 4 is a detail transverse sectional view taken on the line 4—4 of Fig. 3, the view being slightly enlarged to show the controlling valve and the spirally-formed blades or fins for directing the air in a spiral path into the vaporizer.

Referring to this drawing, wherein like parts are designated by similar numerals of reference throughout the several views, 10 designates the casing or body of the vaporizer which is in the form of a pipe of substantially the diameter of the usual intake manifold of an internal combustion engine, and which is provided upon its upper and lower ends with attaching flanges 11 and 12 which may, respectively, be secured to the manifold and the carbureter of an internal combustion engine.

The casing 10 is provided, intermediate its ends, with a relatively large transverse section formed by the provision of transversely alining outturned flanges 13 which are preferably externally screw-threaded.

The casing 10 is provided, in said transverse passage, with a tubular drum provided with heads 14 and a plurality of flues or tubes 15 which open through the heads 14. The peripheral surfaces of the heads 14 taper outwardly from the opposite ends of the tubular drum and are adapted to receive thereover retaining rings 16 which have their inner surfaces oppositely inclined and which are adapted to rest over the opposite ends of the tubular drum. The heads 14 and the rings 16 are adapted to fit snugly in the flanges 13, and are held in place in the body 10 by the provision of laterally extending caps 17 which may be counter-bored to provide shoulders 18, and which are preferably internally threaded for engagement with the flanges 13. The shoulders 18 engage the outer edges of the rings 16 and force the latter over the opposite ends of the tubular drum when the caps 17 are forced into position. The outer ends of the caps 17 are apertured and provided with attaching nipples 19 to which may be secured flexible tubing or the like for conducting heated exhaust gases into one side of the casing 10 and carrying off the heated gases from the opposite side thereof.

The casing 10 is provided, preferably below the transverse passage, with an auxiliary air-intake which is in the form of a hollow lateral extension or elbow 20 which preferably extends downwardly and terminates short of the lower end of the casing 10. The lower end of the air-intake extension 20 is externally threaded and receives thereon a cap 21 provided with peripheral notches or recesses 22 for the reception of the inturned end of a spring finger 23 which is adjustably carried, by means of a set screw 24, upon the outer side of the extension 20. The spring finger 23 is adapted to hold the cap 21 in various adjusted positions upon the lower open end of the extension 20. The cap 21 is provided with an opening therethrough, the wall of which converges outwardly through the cap to form a valve seat 25 against which is normally seated a conical valve 26 having an inwardly extending stem 27 which passes slidably through the intermediate apertured portion of a cross-arm or web 28 formed in the lower outer end of the extension 20. A spring 29 surrounds the stem 27 between the arm 28 and the valve 26 for urging the latter against the seat 25. The cap 21 is adjusted to vary the tension of the spring 29 and thus regulate the quantity of air fed to the charge as the latter is drawn upwardly through the casing 10.

The extension 20 is provided upon its inner wall with a plurality of spirally extending fins or blades 30 adapted to direct the inflowing air in a substantially spiral stream and deliver the same in a whirling condition into the charge as the latter passes through the casing 10. The air is thus adapted to thoroughly mix with the charge and to impart, to some extent, the whirling action of the air and to thus distribute the air and the charge over the entire heating surface of the tubular drum.

The operation of the vaporizer as above-described is as follows:

When the device is interposed between the manifold and the carbureter of an internal combustion engine, and the latter is in operation, the charge is drawn from the carbureter through the casing 10. At the same time, the heated exhaust gases from the engine pass into one cap 17 and out through the opposite cap, and are distributed through the flues or tubes 15 of the drum.

In this manner all of the tubes or flues 15 are thoroughly heated, and as the caps 17 are of relatively large diameter as compared with the inlet nipples 19, the gases are free to expand and travel at a relatively low rate of speed through the tubes. Thus, the tubular drum is thoroughly heated, and as the tubes provide a relatively large heating surface, the charge passing upwardly through the casing 10 is brought into contact with all of these heated tubes and thoroughly heated so that the complete vaporization of the charge is effected. By thus providing the tubular drum, the heated products of combustion are intimately associated with the charge and are thus caused to thoroughly and uniformly heat the same.

When it is desired to supply the charge with an additional amount of air after it leaves the carbureter, the cap 21 may be adjusted, by flexing the finger 23 outwardly from the cap, to relieve the spring 29 more or less of tension and to admit of the unseating of the valve 26 by the suction in the casing 10. In this manner, the desired quantity of air is permitted to enter the extension 20, and as the air passes therethrough it is carried in a spiral stream by the blades 30, and thoroughly admixed with the charge prior to the heating of the same. Thus, the air and the charge are simultaneously heated by contact with the surfaces of the tubes 15, and the air taken in from the auxiliary air-supply does not fill the charge and thus cause the vapor therein to condense.

It is of course understood that various changes and modifications may be made in the details of construction of the above-specifically described fuel vaporizer without departing from the spirit of this invention, and being restricted only by the scope of the following claims.

I claim:

1. In a fuel vaporizer, the combination of a casing provided with intersecting passages therethrough, means for conveying a charge through one of said passages, a tubular drum detachably fitting in the other passage and traversing the path of the charge, and coupling members secured to the casing at the opposite ends of said second passage against the ends of the drum for retaining the drum in position and for directing the heated exhaust gases through the tubular drum.

2. In a fuel vaporizer, the combination of a casing provided with intersecting passages extending therethrough, means for conveying a charge through one of said passages, caps secured to the casing at the opposite ends of the other passage, said caps being adapted to convey heated exhaust gases through said second passage, a tubular drum fitting in said second passage and traversing the first passage, clamping rings secured upon the opposite ends of said drum, and means carried by the caps for engagement with the clamping rings to bind the latter against the opposite ends of the drum and hold the same in position.

3. In a fuel vaporizer, the combination of a casing having a main passage therethrough and provided with a transverse passage intersecting the main passage, a drum composed of a plurality of tubes and supporting heads detachably mounted in the casing in said transverse passage to intersect the main passage, and coupling caps secured to the casing at the opposite ends of the transverse passage and engaging the opposite end of said drum to detachably hold the latter in the casing.

PETER KLOPP.